US011375290B2

(12) United States Patent
Greene et al.

(10) Patent No.: US 11,375,290 B2
(45) Date of Patent: Jun. 28, 2022

(54) RULES-BASED ANCILLARY DATA

(71) Applicant: Source Digital, Inc., Barto, PA (US)

(72) Inventors: Patrick Clay Greene, Van Nuys, CA (US); Henry Lawrence Frecon, Barto, PA (US); Michael Eric Phillips, Melrose, MA (US)

(73) Assignee: Source Digital, Inc., Boyertown, PA (US)

( * ) Notice: Subject to any disclaimer, the term of this patent is extended or adjusted under 35 U.S.C. 154(b) by 0 days.

(21) Appl. No.: 16/130,986

(22) Filed: Sep. 13, 2018

(65) Prior Publication Data

US 2019/0082234 A1 Mar. 14, 2019

Related U.S. Application Data

(60) Provisional application No. 62/558,097, filed on Sep. 13, 2017.

(51) Int. Cl.
*H04N 7/10* (2006.01)
*H04N 21/81* (2011.01)
(Continued)

(52) U.S. Cl.
CPC ......... *H04N 21/8133* (2013.01); *G06Q 30/02* (2013.01); *H04N 21/43074* (2020.08);
(Continued)

(58) Field of Classification Search
CPC ........... H04N 21/812; H04N 21/25883; H04N 21/25891; H04N 21/4532;
(Continued)

(56) References Cited

U.S. PATENT DOCUMENTS 6,219,837 B1 * 4/2001 Yeo .................. H04N 21/47217
725/38
6,298,482 B1 * 10/2001 Seidman ............ H04N 5/44543
725/101

(Continued)

FOREIGN PATENT DOCUMENTS

WO          01/91474 A2    11/2001

OTHER PUBLICATIONS

International Preliminary Report on Patentability for corresponding Patent Application No. PCT/US2018/050965 dated Mar. 26, 2020.

*Primary Examiner* — Annan Q Shang
(74) *Attorney, Agent, or Firm* — Renner, Otto, Boisselle & Sklar, LLP

(57) ABSTRACT

Curating ancillary data to be presented to audience members of a visual program content may include a) creating a timeline rule that correlates ancillary data objects to respective visual program content features, the visual program content features correlated to respective instances on a timeline of the visual program content, b) creating an environmental rule to correlate the ancillary data objects to respective environmental features of an audience member; and c) indicating that the ancillary data objects are to be presented to the audience member when both the timeline rule and the environmental rule are met such that the ancillary data objects may be presented to the audience member when both a) the respective ones of the visual program content features appear in the visual program content during playback by the audience member and b) the respective environmental features are present.

15 Claims, 23 Drawing Sheets

(51) Int. Cl.
　　　*H04N 21/4725* (2011.01)
　　　*H04N 21/45* (2011.01)
　　　*H04N 21/458* (2011.01)
　　　*G06Q 30/02* (2012.01)
　　　*H04N 21/43* (2011.01)

(52) U.S. Cl.
　　　CPC ....... *H04N 21/458* (2013.01); *H04N 21/4524* (2013.01); *H04N 21/4725* (2013.01)

(58) Field of Classification Search
　　　CPC ......... H04N 21/44222; H04N 21/8133; H04N 21/4725; H04N 21/4524; H04N 21/458; H04N 21/4307; G06Q 30/02
　　　See application file for complete search history.

(56) References Cited

U.S. PATENT DOCUMENTS

| | | | | |
|---|---|---|---|---|
| 9,113,193 | B1* | 8/2015 | Gardes | H04N 21/4143 |
| 9,288,533 | B1* | 3/2016 | Di Bernardo | H04N 21/4722 |
| 10,110,933 | B2* | 10/2018 | Cai | H04N 21/812 |
| 2002/0188635 | A1* | 12/2002 | Larson | G06F 40/174 |
| | | | | 715/209 |
| 2003/0121054 | A1* | 6/2003 | Lorenz | H04N 21/4622 |
| | | | | 725/112 |
| 2009/0006208 | A1* | 1/2009 | Grewal | G06Q 30/02 |
| | | | | 705/14.61 |
| 2009/0089314 | A1* | 4/2009 | Hicks | G06Q 30/0603 |
| 2010/0057813 | A1 | 3/2010 | Abe et al. | |
| 2011/0016487 | A1* | 1/2011 | Chalozin | H04N 21/812 |
| | | | | 725/35 |
| 2011/0067062 | A1* | 3/2011 | Karaoguz | H04N 5/445 |
| | | | | 725/40 |
| 2011/0069940 | A1* | 3/2011 | Shimy | H04N 21/42201 |
| | | | | 386/296 |
| 2011/0162002 | A1* | 6/2011 | Jones | H04N 21/812 |
| | | | | 725/32 |
| 2012/0227073 | A1* | 9/2012 | Hosein | H04N 21/4126 |
| | | | | 725/60 |
| 2013/0254041 | A1* | 9/2013 | Sherwin | G06Q 30/02 |
| | | | | 705/14.68 |
| 2014/0165105 | A1* | 6/2014 | Mountain | H04N 21/8456 |
| | | | | 725/46 |
| 2015/0067710 | A1* | 3/2015 | Bhogal | G06Q 50/01 |
| | | | | 725/14 |
| 2015/0189347 | A1 | 7/2015 | Oztaskent et al. | |
| 2016/0062569 | A1* | 3/2016 | Jenkins | H04N 21/42224 |
| | | | | 715/716 |
| 2017/0026698 | A1* | 1/2017 | Di Bernardo | H04N 21/4725 |
| 2017/0228785 | A1* | 8/2017 | Evje | G06Q 30/0261 |
| 2018/0084310 | A1* | 3/2018 | Katz | G06F 16/7837 |
| 2018/0184154 | A1* | 6/2018 | Braskich | H04N 21/44222 |
| 2018/0310043 | A1* | 10/2018 | Wang | H04N 21/44008 |

* cited by examiner

Figure 3F

RULES-BASED ANCILLARY DATA

BACKGROUND

Media content is produced, processed, and then transmitted to consumers. In addition to traditional media content, the proliferation of electronic communication technologies has allowed for mass delivery of data related to or enhancing the content. For example, technologies such as instant messaging provide a medium by which to deliver electronic information to one person or a large number of people very quickly. Electronic devices including, for example, personal computers, mobile phones, personal digital assistants, and television set-top boxes (e.g., cable set top boxes, satellite set top boxes, etc.), provide ready access to consumers of information. The type and content of data that may be delivered via modern communication technologies varies greatly and comprises everything from personal information, to informational content, to advertisement.

At any moment in any piece of visual or audio-based content there is a vast array of ancillary data that is virtually unlimited in its association and context. Examples are not limited to, but include cast members, location data, music, costume information, brands and products, and customary information native only to the individual programming. But current technologies are deficient in deploying such ancillary data for consumption. Currently, there is not a way to adequately and efficiently curate and distribute ancillary data relating to content.

SUMMARY OF THE INVENTION

The present disclosure provides methods and systems to address these problems. The present disclosure discloses a product suggestion and rules engine that allows a user to set conditions against this array of data. These conditions are vast in what can be applied but may be designed so as to establish rules and/or suggestions that would apply against any of the ancillary data. Ancillary data may then be triggered based on a combination of the assigned condition and the inheritance of an externally detected conditional event. Some examples of this include the ability to use costume data to reach out automatically against an array of retailers so that a recommendation may be quickly established based on the ancillary data assigned to that particular costume item. Further, the use of the conditionally defined rule, leverages the detection of a user's or device's geographic data and even information from their publicly available profile to trigger the event that applies to the defined rules. This is so that the user may see the suggested product from the retailer that best matches their geography and in a way that appeals best to them based on their publicly available or allowed user data.

Users have personal desires or inquiries about ancillary data within programming. These personal desires or inquiries are often related to the user's environment such as their geography, their gender, race, ethnicity, time zone, and other allowable and/or publicly available profile information. Rules or conditions may be assigned to an individual piece of ancillary data to make good use of this environmental information to specifically cater to audiences. On the other hand, where a retail product association may otherwise be offered but the state or geographic region has restrictions on such product, a rule may avoid the offering. The invention may also help in fulfilling laws, regulatory rules, and/or restrictions applicable to a particular piece of data that may be restricted in terms of geography, age, or other reasons.

Prior to this invention, the ability did not exist to have rules that could be applied on a micro level within any moment in any region requested by a device or user against any class of ancillary data, or that could leverage the viewer or devices detected factors and instantaneously respond to that device or user based on the assigned rule and/or condition.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIGS. 3A-3G illustrate an exemplary graphical user interface (GUI) for curating ancillary data.

DETAILED DESCRIPTION

Figure 1A:
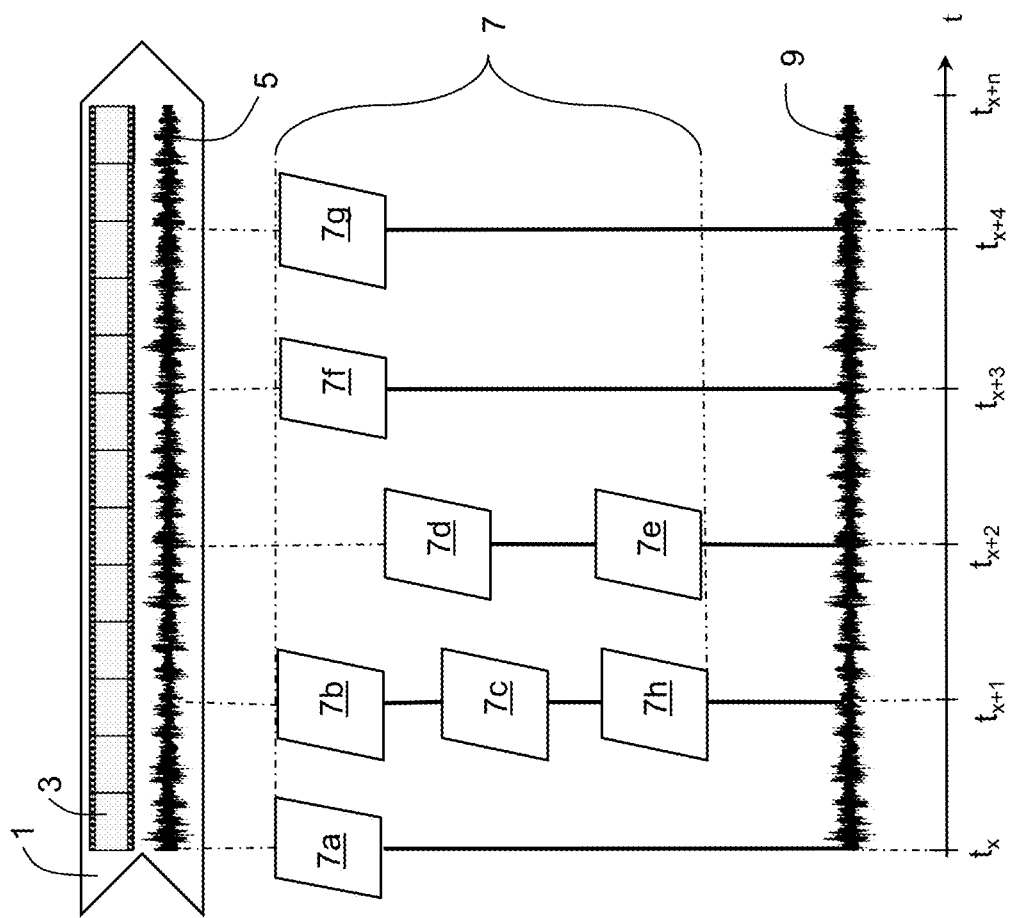
FIG. 1A illustrates a schematic diagram of an exemplary method or system for presenting ancillary data to audience members of a visual program content.

FIG. 1A illustrates a schematic diagram of an exemplary method or system for presenting ancillary data to audience members of a visual program content. FIG. 1A shows an audiovisual content 1, which includes a visual portion 3 and an audio portion 5. The audiovisual content 1 may be a movie, a TV show, a sports event (e.g., basketball game), Internet video, a video game, a virtual reality (VR), augmented reality (AR), or mixed reality (MR) environment, or audio only programs via radio, Internet, etc.

FIG. 1A also shows ancillary data 7. The ancillary data 7 is data that is related to the content and may include data describing the content such as content name or content identification data, data about a script played out in the content, data about wardrobe wore by characters in the content, data including comments from performers, producers, or directors of the content, an Uniform Resource Locator (URL) to a resource that includes information about the content, data about music in the audio of the content, the live score of a sports event, etc. Ancillary data 7 may include commercial data such as advertisement data. Ancillary data 7 may also include user data such as comments from viewers of the content (e.g., twitter messages, etc.) Ancillary data 7 may also include professional or technical data such as statistics of the content's audio including, for example, loudness or dynamic range scaling of the content's audio, etc. Ancillary data 7 may also include blockchain level access to another application. As can be seen from the above examples, what constitutes ancillary data 7 may vary widely and may be collected from a variety of sources. A user may select ancillary data object (e.g., by clicking or touching the display on which the content (and/or the ancillary data object) is displayed) to interact with the ancillary data. On example of interacting with ancillary data is obtaining information and/or purchasing a product suggested as ancillary data. The system of FIG. 1A may present ancillary data 7 synchronized to the content 1. The ancillary data 7 may represent or lead to a product with which the audience member selecting the ancillary data object may purchase or interact.

Some methods of synchronization of content 1 and ancillary data 7 may be straightforward and may simply require an explicit data connection between the content's source and the target or consumer. This explicit timing data communicates the timing to equipment at the consumer premises. Other current methods of synchronization may rely on metadata attached to the content 1, which may or may not be present all the way through the signal chain from the source or content provider to the target or consumer since different facilities will use various workflows or content container formats which may or may not support metadata.

FIG. 1A illustrates a representation 9 of the audio portion 5 of the audiovisual content 1 in the form of an audio waveform signature. The representation 9 matches the audio portion 5 of the audiovisual content 1 at least to the extent that the audio portion 5 is identifiable from the representation 9 along the time t. In the embodiment of FIG. 1A, the ancillary data 7 are each correlated to the representation 9 at instants of the representation 9 corresponding to the instants of the audio portion 5 to which the ancillary data 7 is aligned. In this manner, the ancillary data 7 may each be correlated to instants of the content 1.

In one embodiment, the ancillary data 7 may be correlated to a duration or time period (and not merely one instant) on the content 1. In such embodiment, the ancillary data 7 may be correlated to two (or more) instants on the content 1 representing a start and an end, respectively, of the duration on the content 1 (e.g., a movie scene). In another embodiment, the ancillary data 7 may be correlated to start instant and a duration on the content 1 applicable to the ancillary data 7 defined. In such embodiment, the ancillary data 7 may be correlated to the starting (or ending) instant on the content 1 representing a start and an end, respectively, of the duration on the content 1 (e.g., a movie scene) and the duration specified as an absolute term.

In the example of FIG. 1A, ancillary data A is correlated to the instant of representation 9 corresponding to time $t_x$ of the audiovisual content 1. Ancillary data 7b, 7c, and 7h are correlated to the instant of representation 9 corresponding to time $t_{x+1}$ of the audiovisual content 1. Ancillary data 7d and 7e are correlated to the instant of representation 9 corresponding to time $t_{x+2}$. Ancillary data 7f is correlated to the instant of representation 9 corresponding to time $t_{x+3}$ of the audiovisual content 1 and ancillary data 7g is correlated to the instant of representation 9 corresponding to time $t_{x+4}$ of the audiovisual content 1. Each of the ancillary data 7 and the representation 9 may then be stored in a database that may be made accessible to future users or viewers of the audiovisual content 1. This way, when the audiovisual content 1 is distributed to those users or viewers, the representation 9 as well as the ancillary data 7 correlated to the representation 9 may be available to those users or viewers.

At the user's premises, the audio portion 5 of the audiovisual content 1 being received may be compared real-time to the representation 9 to synchronize the audio portion 5 and hence the audiovisual content 1 to the representation 9. Moreover, since the ancillary data 7 is correlated to the instants of the representation 9 corresponding to their respective times of the audiovisual content 1, the ancillary data 7 may be synchronized to the audiovisual content 1 even in the absence of explicit timing data.

Although in the embodiment of FIG. 1A the content's audio is used to synchronize the ancillary data 7 to the content 1, the present invention is not so limited. The ancillary data 7 may be synchronized to the content 1 as otherwise described herein and/or as known in the art.

In the illustrated embodiment of FIG. 1A, ancillary data 7a is aligned to (i.e., it appears at or relates to) a time $t_x$ of the audiovisual content 1. Ancillary data 7b and 7c appear at or relate to a time $t_{x+1}$ of the audiovisual content 1. Ancillary data 7d and 7e appear at or relate to time $t_{x+2}$. Ancillary data 7f appears at or relates to time $t_{x+3}$ of the audiovisual content 1 and ancillary data 7g appears at or relates to time $t_{x+4}$. For example, ancillary data 7a at $t_x$ may indicate the content's name, True Blood, season 2, episode 2. At time $t_{x+1}$ (e.g., at 12 m 2 s) ancillary data 7b describes Sookie Stackhouse (character), played by Anna Paquin (actor) is wearing Manolo Blahnik Hangisi 105 mm satin pump shoes (accessories) while ancillary data 7c indicates that the music is Beethoven's Moonlight Sonata performed by the London Symphony Orchestra. Ancillary data 7d and 7e may be twitter messages received at time $t_{x+2}$ in which users express their reactions to the audiovisual content 1 or a particular scene in the audiovisual content 1. Ancillary data 7f may indicate a change at $t_{x+3}$ in the prescribed loudness or dynamic range scaling of the content's audio due to a commercial break or can be made more granular than just entire program. Ancillary data 7g may indicate a change at $t_{x+4}$ in the prescribed loudness or dynamic range scaling of the content's audio due to a return to the audiovisual content 1 from the commercial break.

Another type of ancillary data may be coordinate data of the visual portion 3 of the content 1. For example, ancillary data may include data that identifies a set of coordinates representing a location within the visual portion 3 of the audiovisual content 1 and data that identifies the center and shape of an object located within the visual portion 3 of the audiovisual content 1 at the location represented by the set of coordinates. In FIG. 1A, the ancillary data 7h may be a set of x, y coordinates (True Blood being a two-dimensional TV show) corresponding to the visual portion 3 of the content 1. The coordinates 7h correspond to the location on the visual portion 3 of ancillary data 7b, Sookie Stackhouse's Manolo Blahnik Hangisi 105 mm satin pump shoes or a related item as suggested by the system.

With this information being part of the ancillary data 7, a user may query the ancillary data system for audiovisual content in which Manolo Blahnik Hangisi 105 mm satin pump shoes appear. Search results can be Manolo Blahnik, and/or 105 mm satin pumps (product). The result of the query would be, not only True Blood, season 2, episode 2 as the audiovisual content, but also $t_{x+1}$ (e.g., at 12 m 2 s) as the time+duration into the audiovisual content 1 in which the shoes appear and the coordinates x, y as the precise location of the shoes on the visual portion 3. Alternatively, the user may query the ancillary data system for audiovisual content in which Manolo Blahnik Hangisi 105 mm satin pump shoes appear at coordinates x, y. The result of the query would be True Blood, season 2, episode 2 at time $t_{x+1}$ (e.g., at 12 m 2 s).

A user's actual geographical location may be detected and ancillary data relating to the location may be offered to the user. For example, if a movie scene takes place at the user's current geographical location, the movie or scene may be offered to the user for viewing or purchase.

Similarly, with the coordinate set ancillary data available, a user may query the ancillary data system for what ancillary data is at a location within the visual portion of an audiovisual content identified by a set of specific point, or shape coordinates. For example, the user may search for what is at coordinates x, y at time $t_{x+1}$ or from within a given shape of the audiovisual content 1, True Blood, season 2, episode 2. A result of the query would be Manolo Blahnik Hangisi 105 mm satin pump shoes. To query the system the user may, for example, touch the screen of a device at coordinates x, y at time $t_{x+1}$ of the audiovisual content 1, True Blood, season 2, episode 2. The system may detect the touch at the specific location, search ancillary data, and output information identifying the object(s) at the specific location.

The above query combinations are merely illustrative. Many other query combinations are possible in which coordinates as ancillary data allow for more advanced utilization of the audiovisual content and ancillary data in general.

Also, FIG. 1A illustrates a two-dimensional example (True Blood being a two-dimensional TV show) but the ancillary data system disclosed here is not limited to two dimensions and may include three-dimensional coordinates (x, y, z) for three-dimensional content (e.g., 3D video games, 3D movies, 3D virtual reality, etc.) as described below.

The inclusion of coordinates as ancillary data provides further opportunities for more advanced utilization of the audiovisual content and ancillary data in general. Coordinates as ancillary data may correspond to simple relative coordinates such as, for example, coordinates x, y representing simply the location within a video frame (e.g., x=0-1920, y=0-1080) or a given shape (min of three coordinates if aspect ratio is known) of the content 1. However, coordinates as ancillary data may correspond to coordinates relative to alternative spaces or areas such as, for example, coordinates x, y representing the location within the video frame of the content 1 and at the same time the location within another space or area (e.g., a virtual space, a space within a video game, a space within a different audiovisual content, etc.) Coordinates as ancillary data may also correspond to absolute coordinates that can be correlated to other spaces or areas such as, for example, coordinates x, y representing the location within the video frame of the content 1 and at the same time the location within a real world space (e.g., a stadium, a city, a country, a planet, the universe, etc.)

Moreover, coordinates corresponding to alternative spaces or areas do not need to be absolute or relative to the coordinates corresponding to the location on the visual portion 3 of the content 1. These coordinates corresponding to alternative spaces or areas may simply be tied or correlated to the coordinates corresponding to the location on the visual portion 3 of the content 1. For example, the coordinates corresponding to alternative spaces or areas may be correlated as ancillary data to the corresponding instant in the synchronization data 9 to tie or correlate them to the coordinates corresponding to the location on the visual portion 3 of the content 1. These additional layer of coordinates become an additional layer of ancillary data.

Figure 1B:
FIGS. 1B and 1C illustrate exemplary screen shots for presenting ancillary data to audience members of a visual program content.
Figure 1C:

FIGS. 1B and 1C illustrate exemplary screen shots for presenting ancillary data to audience members of a visual program content. The content 1 in the example of FIGS. 1B and 1C is the movie Ocean's 8.

In FIG. 1B, while enjoying the content 1 an audience member has touched or clicked on the character Debbie Ocean played by Sandra Bullock. Ancillary data correlated to that instant in the timeline (e.g., the whole movie, the particular scene, the particular character, etc.) and that location on the screen becomes visible on the screen. In the example of FIG. 1B, the audience member is presented with the options of accessing information on the actress, Ms. Bullock, the jacket she is wearing (Burberry®), or the glasses in front of her (Cartier®). The audience member may further touch or click on the choices presented to be given the opportunity to learn more about Ms. Bullock and/or purchase the jacket or the glasses.

In FIG. 1C, the audience member has touched or clicked on the name of the restaurant, Veselka, on the window. As a result, ancillary data correlated to that instant in the timeline (e.g., the whole movie, the particular scene, the particular character, etc.) and that location on the screen becomes visible on the screen. In the example of FIG. 1C, the audience member is presented with the options of accessing information on the restaurant, Veselka, or the geographical location (e.g., Google® Maps) of the restaurant. The audience member may further touch or click on the choices presented to be given the opportunity to learn more about these places and maybe purchase a gift certificate to the restaurant.

The question becomes: how does the ancillary data 7 become correlated to specific instants of the content 1?

Figure 2A:
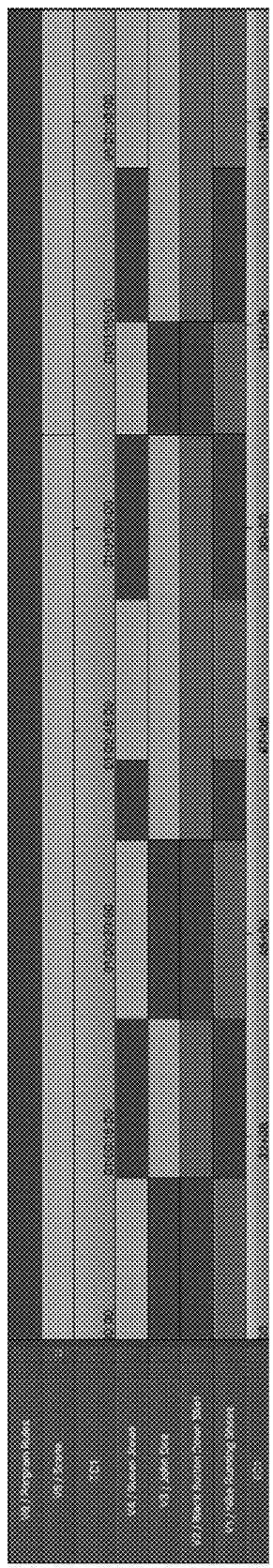
FIG. 2A illustrates an exemplary graphical user interface (GUI) for curating ancillary data.

FIG. 2A illustrates an exemplary graphical user interface (GUI) 200 for curating ancillary data. The exemplary GUI 200 includes six tracks V1-V6 and timing information in the form of a time code TC1 and an edge code EC1. Aspects of the content 1 such as content title, characters, content script or plot, content scene, wardrobe wore by the characters, performers, producers, or directors of the content, items appearing in the content, geographical locations where the content storyline takes place, music in audio of the content, etc. may be defined as content features and may be correlated in the GUI 200 to respective instances on the timeline TC1 of the visual program content 1. For example, track V6 spans the length of the whole program or content 1 but track V5 includes scenes that span only the length of a particular scene within the content 1. Thus, scene 1 and scene 2 are content features that are correlated to respective instances or time period of the content 1. Similarly, track V4 defines time periods within the content 1 in which a content feature, a particular character "Susan Jones," appears. Track V3 defines time periods within the content 1 in which another particular content feature, character "John Doe," appears. Track V2 defines time periods within the content 1 in which a particular wardrobe "Black Button Dress Shirt" appears. Track V3 defines time periods within the content 1 in which another particular wardrobe "Nike Running Shoes" appears. Although a number of tracks is used for purposes of illustration, a potentially infinite number of tracks may be possible to allow for, for example, many actors, wardrobe, etc.

Figure 2B:
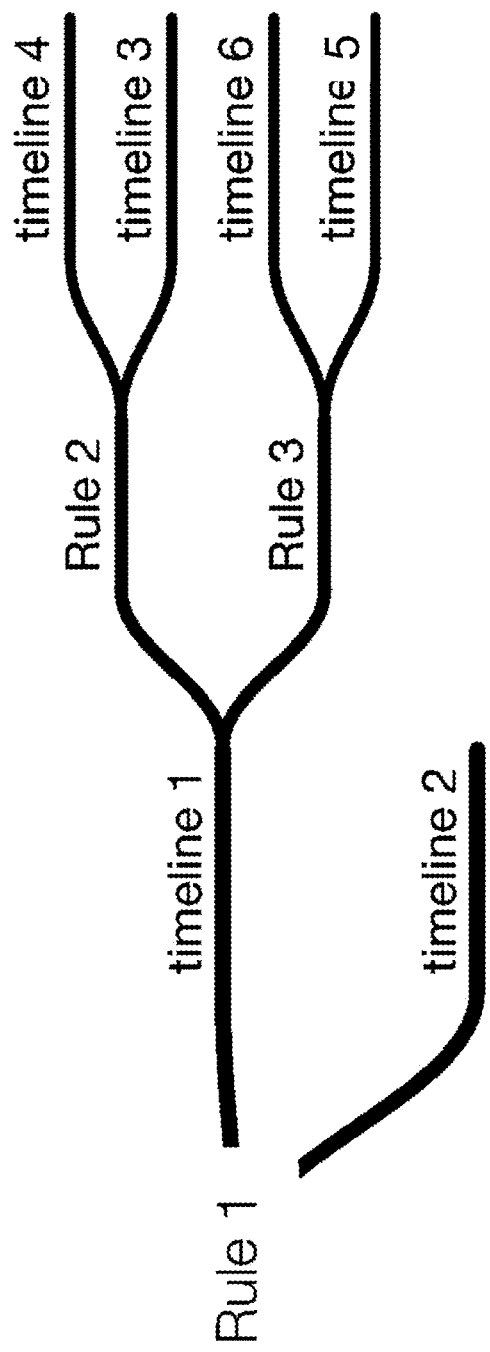
FIG. 2B illustrates a schematic diagram of an exemplary multi-timeline scenario for presentation of ancillary data.

Although one timeline is shown in FIG. 2A for purposes of illustration, a potentially infinite number of timelines are possible. For example, each user may have a different timeline, or a different timeline may be used depending of the outlet for the content 1. If the content 1 is playing on a first channel or network, one timeline may be used while, if the content 1 is playing on a second (different from the first) channel or network, a second (different from the one) timeline may be used. FIG. 2B illustrates an example of this multiple timeline approach. After rule 1 is executed, the system may diverge from timeline 1 based on some event taking place (or not taking place). So, for example, if the audience member has not engaged for some set period of time, the system may present new interactions by switching to a timeline 2. If, instead, the system had continued on timeline 1, the system may branch to yet more different timelines based on conditions such as environmental rules as described herein. So, in FIG. 2B, upon rule 2 taking effect, the timeline diverts from timeline 1. Upon rule 3 taking effect, the timeline diverts in yet another direction. Ultimately, a large number of timelines is possible. In the example of FIG. 2B timelines 3, 4, 5, and 6 may be engaged depending on conditions.

The visual program content 1 features being correlated to respective instances on the timeline of the visual program content 1 may allow for the correlation of ancillary data 7 to the timeline by creating timeline rules that refer to the content features. As described in detail below, the GUI 200 may be used to reflect timeline rules that correlate ancillary data objects to program features of the content 1. As also described in detail below, the GUI 200 may further be used to reflect environmental rules that correlate ancillary data objects to environmental features of an audience member.

FIGS. 3A-3G illustrate an exemplary graphical user interface (GUI) 300 for curating ancillary data. The GUI 300 may be used for curating ancillary data by creating timeline rules that correlate ancillary data objects to content features and environmental rules that correlate ancillary data objects to environmental features of an audience member. In the example of FIGS. 3A-3G, the GUI 300 is used to create a rule that correlates ancillary data regarding a product (a bottle of 1961 Chateau Chavel Blanc wine) to time periods in the content 1 in which a cast member appears in the content 1 and to environmental features of the audience member.

Figure 3A:
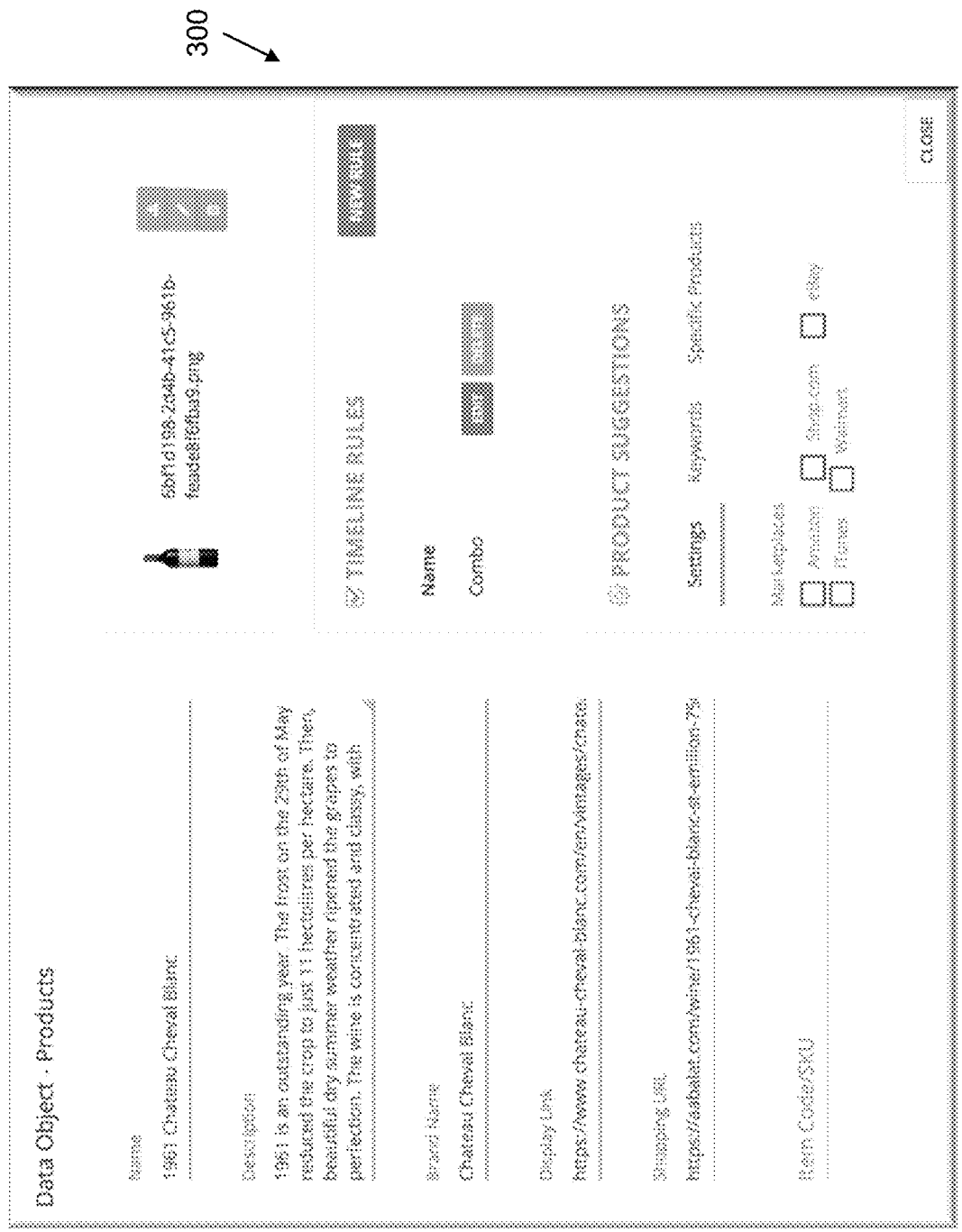

As shown in FIG. 3A, a user or curator may find the product (a bottle of 1961 Chateau Chavel Blanc wine) including information (e.g., name, description, brand name, display link, shopping URL, etc.) about the product as an ancillary data object in a database. The user or curator may then add a timeline rule in which the ancillary data object (in this case the wine bottle) is correlated to the content feature by clicking NEW RULE.

The wine bottle is an example where a specific product may be offered as ancillary data. In one embodiment, instead of a specific product, a specific service or shopping engine (e.g., Amazon®, shop.com) may be offered as ancillary data in much the same way. Services and/or shopping engines are offered in a similar manner as products, however when a user selects an ancillary data object (e.g., by clicking or touching the display on which the content (and/or the ancillary data object) is displayed) for a service and/or shopping engine, the rules engine may use keywords from the content 1 or content feature (e.g., a particular character's name correlated to the ancillary data object or any other user defined keywords) to create a query that may be sent to the service or shopping engine to return product results, a product suggestion in effect.

Figure 3B:
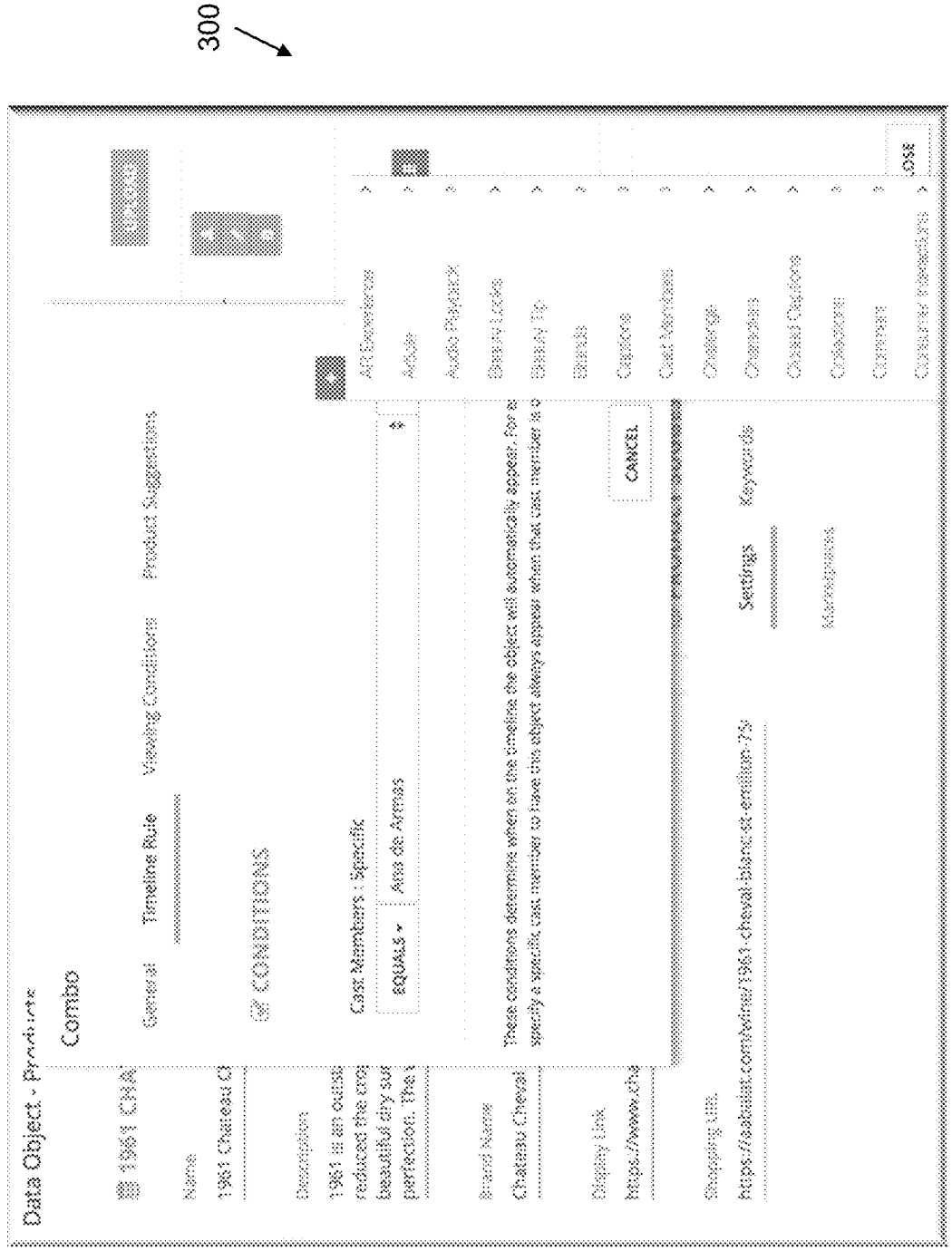

FIG. 3B illustrates how the user or curator may add a new timeline rule in which the ancillary data object (the wine bottle) is correlated to a content feature (a cast member) using the GUI 300. The user may indicate the timeline rule for the ancillary data object (the wine bottle) as: cast members>specific>equals>Ana de Armas. If this simple timeline rule is implemented, every time Ana de Armas would appear on the program/content 1, the ancillary data object referring to the bottle of 1961 Chateau Chavel Blanc wine would be presented to the audience member watching the content 1.

Rules stacking is possible. The user or curator may continue to add timeline rules in which the ancillary data object (the wine bottle) is correlated to other content features. For example, the user may add a timeline rule that specifies that the ancillary data object is to be presented to the audience member "Any time Ana de Armas is on screen AND the mood is happy AND it's day time on screen." Timeline rules can become very complex and utilize Boolean logic with grouping to allow creation of theoretically any possible combination of data to the rule.

The GUI 300 may further be used for curating ancillary data by creating environmental rules that correlate ancillary data objects to environmental features of the audience member. Environmental features of the audience member may include a date range in which the audience member watches the visual program content, a geographical location of the audience member, gender of the audience member, age range of the audience member, etc.

Figure 3C:
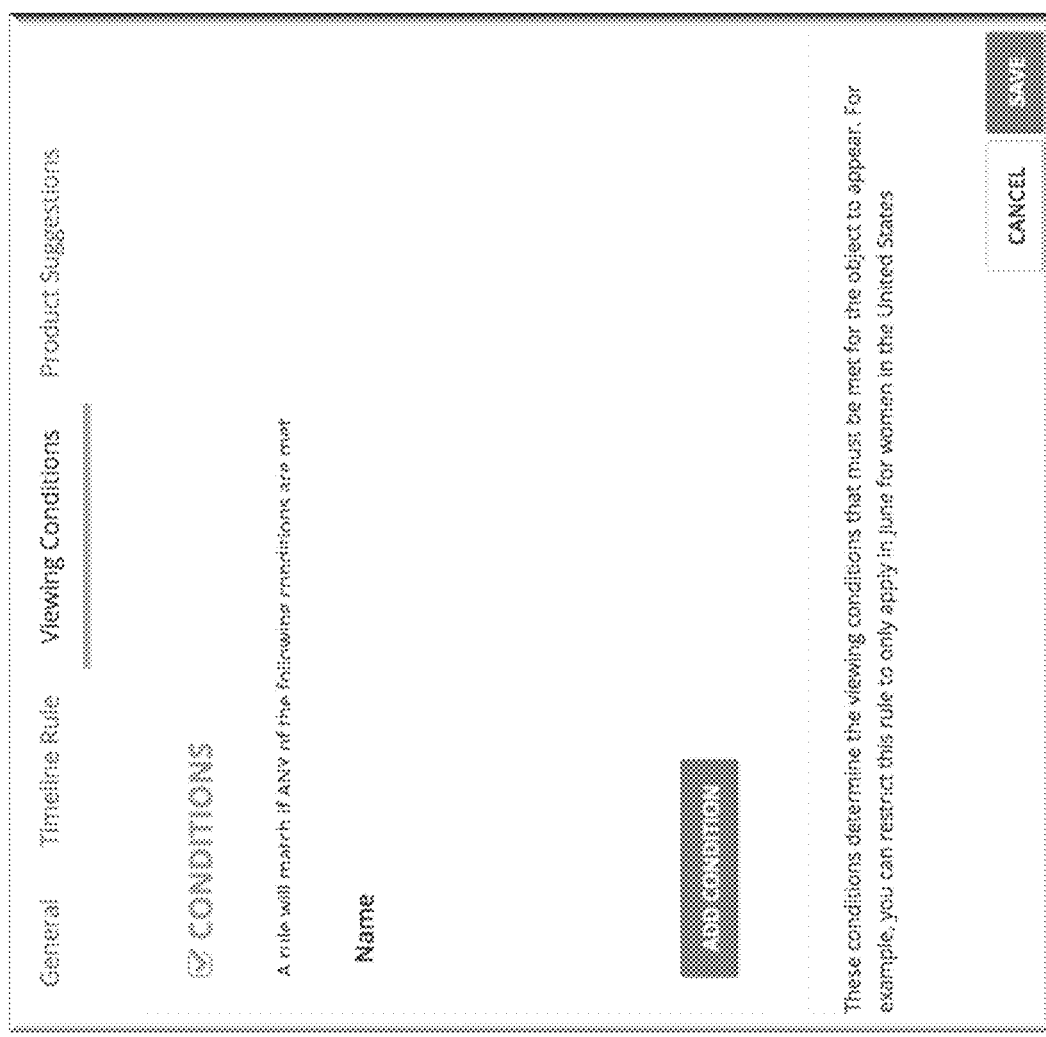
Figure 3D:
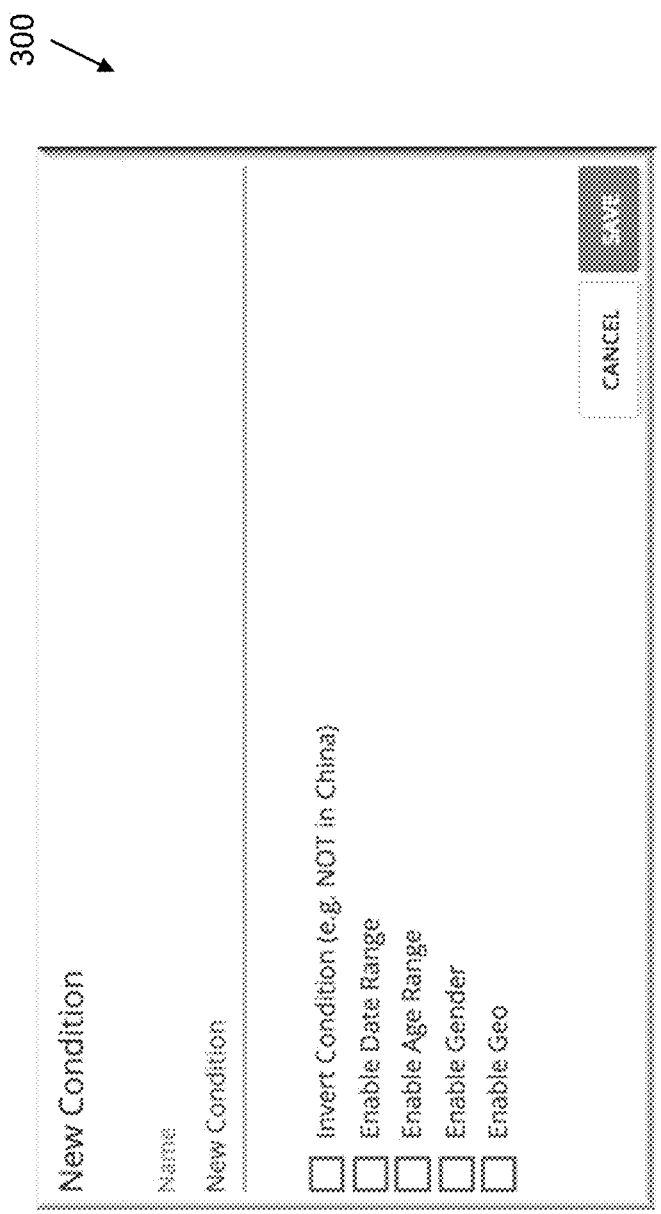

As illustrated in FIG. 3C, a user or curator may add an environmental rule consisting of viewing conditions by clicking ADD CONDITION. As shown in FIG. 3D, the environmental rule portion or new condition may involve a date range for when the audience member consumes the content 1, an age range of the audience member, gender of the audience member, or geography of the audience member. The new condition or environmental rule portion may also be an invert condition in which, instead of specifying a date range, an age range, gender, or geography of the audience member, the opposite is specified. So, for example, every geography except China, any age except 1-17, any day except September 11, etc. may be specified.

Figure 3E:
Figure 3F:
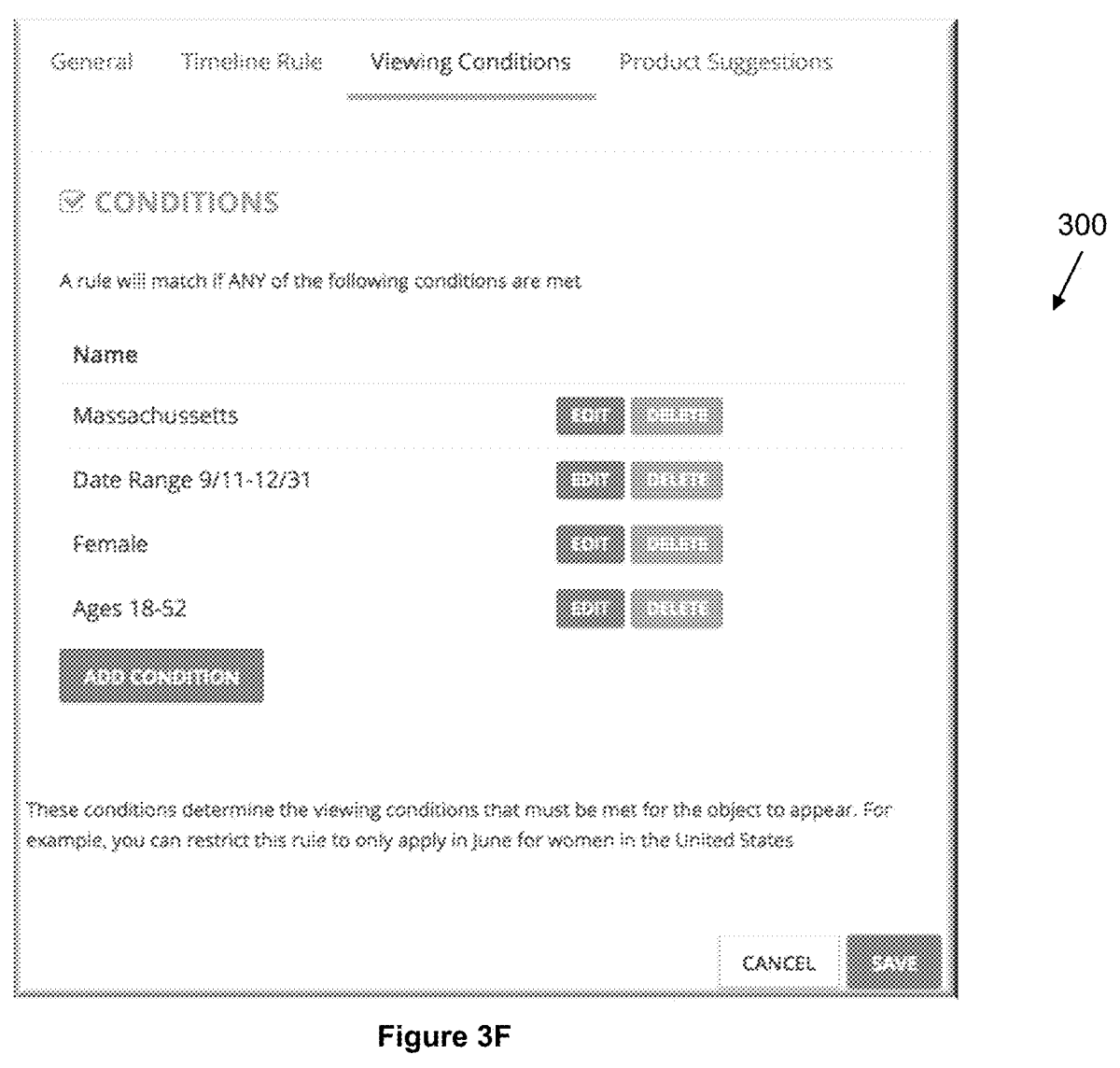
Figure 3G:
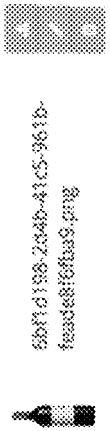

FIG. 3E illustrates that a date range condition was selected and specified as from Sep. 11, 2018 to Dec. 31, 2018. The user or curator may continue to stack conditions as desired to create the desired environmental rule or rules. FIG. 3F illustrates the final environmental rule specifying the target audience member as a female, ages 18-52, from Massachusetts watching the content 1 from Sep. 11, 2018 to Dec. 31, 2018. As shown in FIG. 3G, a rule has been created that ancillary data regarding the product (a bottle of 1961 Chateau Chavel Blanc wine) is to be presented to an audience member that is a female, ages 18-52, from Massachusetts watching the content 1 from Sep. 11, 2018 to Dec. 31, 2018 at time periods in the content 1 in which a cast member "Ana de Armas" appears in the content 1. The ancillary data object will be presented to particular audience members accordingly.

Figure 4:
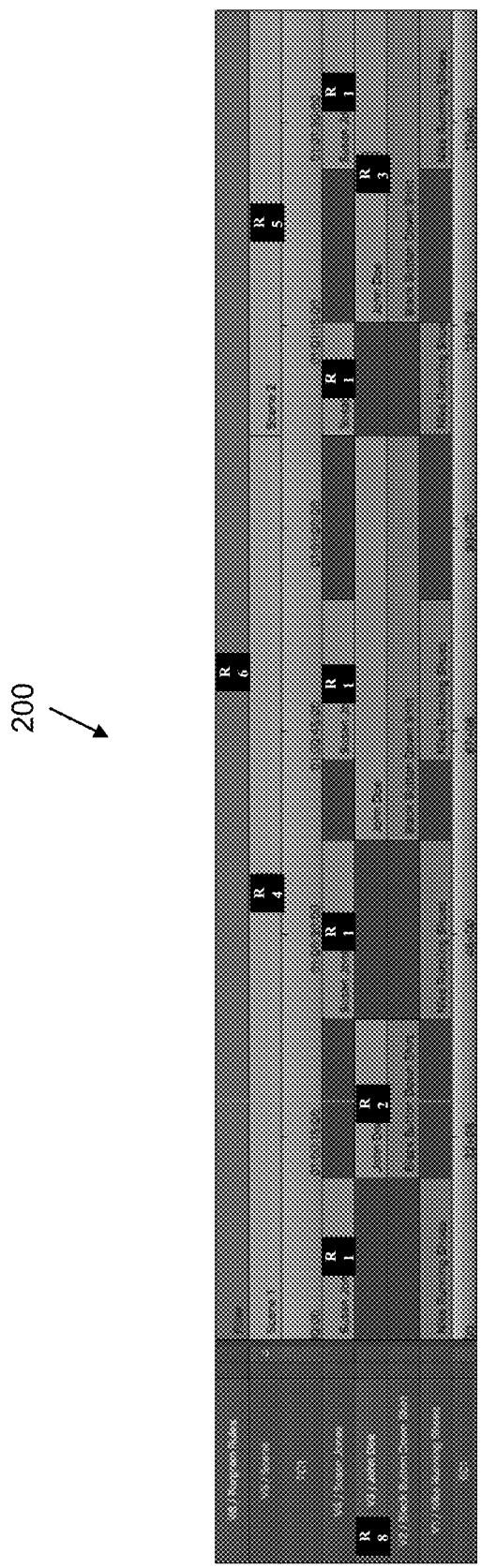
FIG. 4 illustrates the exemplary GUI of FIG. 2A for curating ancillary data.

FIG. 4 illustrates the exemplary GUI 200 for curating ancillary data. As described above, the GUI 200 may be used to reflect timeline rules that correlate ancillary data objects to program features of the content 1 and environmental rules that correlate ancillary data objects to environmental features of an audience member. The rules may be represented by icons. For example, a rule R6 has been applied to the content feature (the whole content 1) on track V6 which spans the length of the whole program or content 1. A rule R4 has been applied to the content feature Scene 1 which spans the length of the particular scene on track V5 while rule R5 has been applied to the content feature Scene 2 which spans the length of the particular scene on track V5. Similarly, a rule R1 has been applied to the content feature, character "Susan Jones," on track V4. A rule R8 has been applied to the content feature, character "John Doe," on track V3 whenever John Doe appears. In contrast, a rule R2 has been set for a specific first time period (not all time periods) within the content 1 in which the content feature, character "John Doe," appears in the content 1 and a rule R3 has been set for a specific second time period (not all time periods) within the content 1 in which the content feature, character "John Doe," appears in the content 1.

Figure 5:
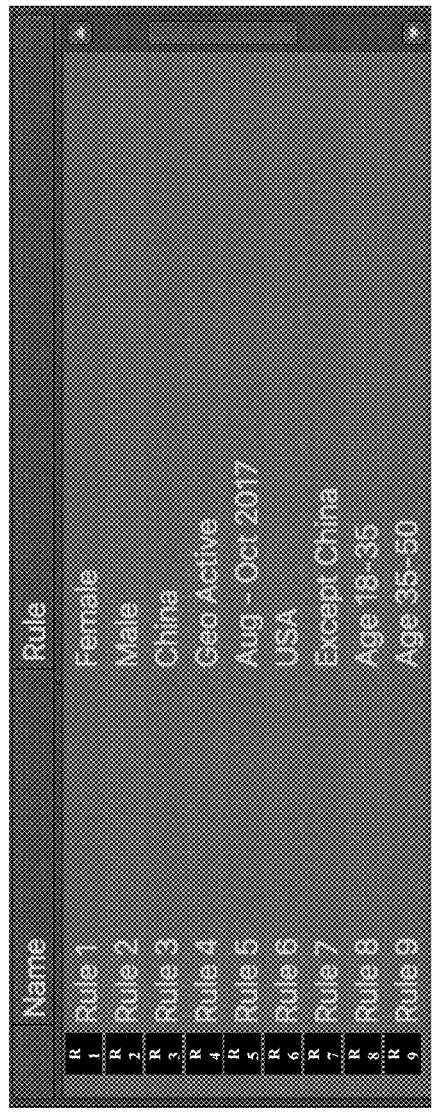
FIG. 5 illustrates nine exemplary environmental rules or conditions.

As shown in FIG. 5, there may be a preset list of common environmental rules or conditions as well as the ability for the user to create custom rules. FIG. 5 lists nine exemplary common environmental rules or conditions. Rule 1 (R1) =female audience member, rule 2 (R2)=male audience member, rule 3 (R3)=audience member geography is China, rule 4 (R4)=geo active, rule 5 (R5)=audience member watching from August to October 2017, rule 6 (R6)=audience member in the United States, rule 7 (R7)=audience member geography is not China, rule 8 (R8)=audience member's age is 18-35, and rule 9 (R9)=audience member's age is 35-50.

Returning to FIG. 4, let's study the rules applied to the content feature, character "John Doe," on track V3. First, the rule R6 (audience member in the United States) applies to the whole content 1. Second, the rule R4 (geo active) applies to the time periods in which "John Doe" appears in Scene 1 while rule R5 (audience member watching from August to October 2017) applies to the time periods in which "John Doe" appears in Scene 2. The rule R8 (audience member's age is 18-35) has been set for whenever John Doe appears. In contrast, a rule R2 (male audience member) has been set for specific time periods (not all time periods) within the content 1 in which the content feature, character "John Doe," appears and a rule R3 (audience member geography is China) has been set for other specific time periods (not all time periods) within the content 1 in which the content feature, character "John Doe," appears.

In one embodiment, rules are applied top to bottom so that program rules are applied first, scene rules second, track rules third, and feature rules last. In the example of FIG. 4, John Doe appears three times. The first time John Doe appears, rules R6, R4, R8, and R2 (in that order) apply. Therefore, the ancillary data object is presented to the audience member if the audience member in the United States, the audience member is geo active, the audience member is 18-35, and the audience member is male. The second time John Doe appears, rules R6, R4, and R8 (in that order) apply. Therefore, the ancillary data object is presented to the audience member if the audience member is in the United States, the audience member is geo active, and the audience member is 18-35 (male or female). The third time John Doe appears, rules R6, R5, R8, and R3 (in that order) apply. Therefore, the ancillary data object is presented to the audience member if the audience member in the United States, the audience member is watching from August to October 2017, and the audience member is 18-35. The ancillary data object is also presented to all audience members in China because of rule R3.

It should be clear from the above that curation may take place post hoc but also live. For example, ancillary data may include live scores of a basketball game as the game is being played. Curation may be effected by a human user or operator or by a machine operating based on an algorithm, artificial intelligence, etc.

FIGS. 6-10 illustrate block diagrams of exemplary rules to correlate ancillary data objects to content features and/or environmental features of the audience member.

Figure 6:
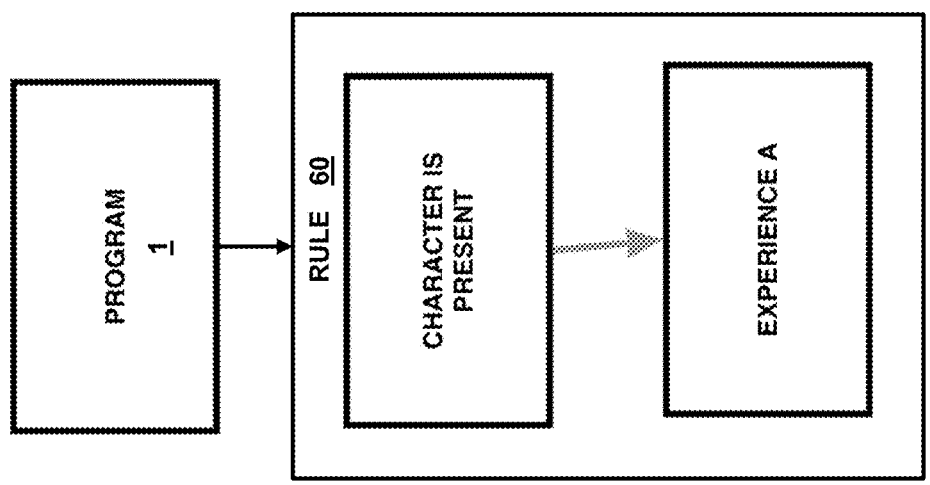
FIGS. 6-10 illustrate block diagrams of exemplary rules to correlate ancillary data objects to content features and/or environmental features of the audience member.

FIG. 6 illustrates a simple timeline rule 60 applicable to a program 1. In the timeline rule 60, if a particular character is currently present on screen, an experience A (which presents one or more ancillary data objects to the audience member) is offered.

Figure 7:
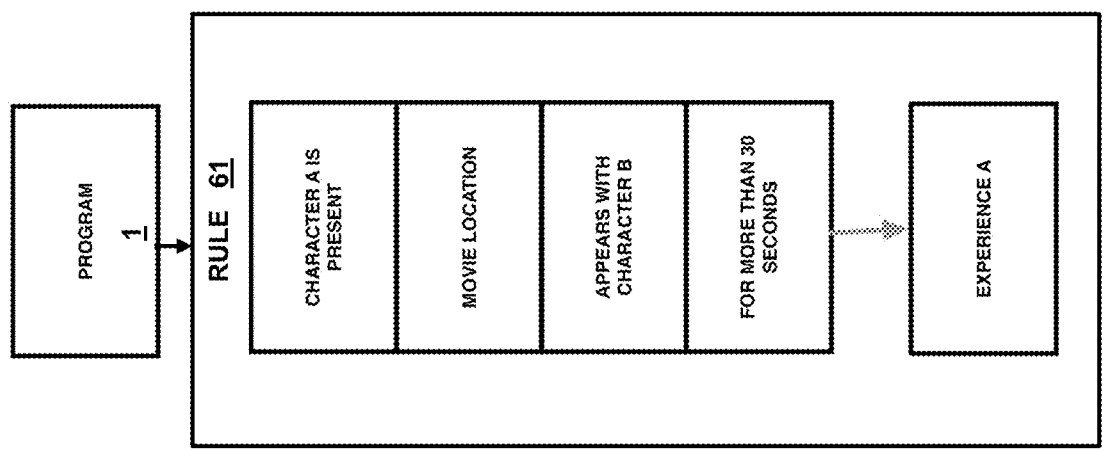

FIG. 7 illustrates a more complex timeline rule 61 applicable to the program 1. In the timeline rule 61, if a particular character is currently present on screen, and the movie takes place at a specific location, and a second character appears with the first character for more than 30 seconds, an experience A (which presents one or more ancillary data objects to the audience member) is offered.

Figure 8:
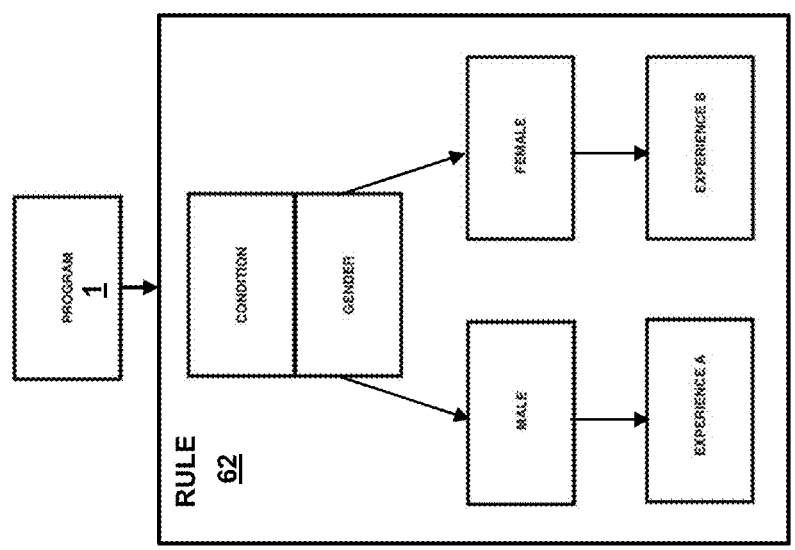

FIG. 8 illustrates a simple environmental rule 62 applicable to the program 1. In the environmental rule 62, if the audience member is male, an experience A (which presents one or more ancillary data objects to the audience member) is offered while if the audience member is female, an experience B (which presents one or more ancillary data objects different from those of experience A to the audience member) is offered.

Figure 9:
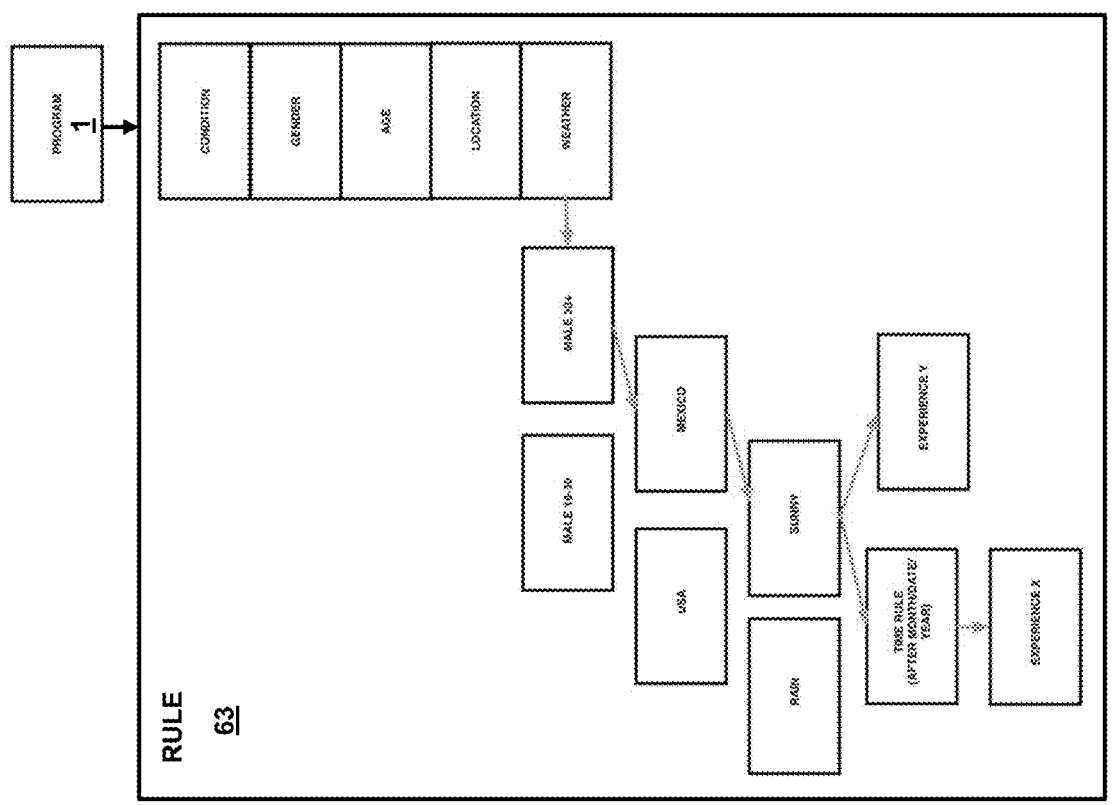

FIG. 9 illustrates a more complex environmental rule 63 applicable to the program 1. In the environmental rule 63, if the audience member is male, older than 30, in Mexico, where it is sunny, an experience Y (which presents one or more ancillary data objects to the audience member) is offered until a certain date after which an experience X (which presents one or more ancillary data objects different from those of experience Y to the audience member) is offered.

Figure 10:
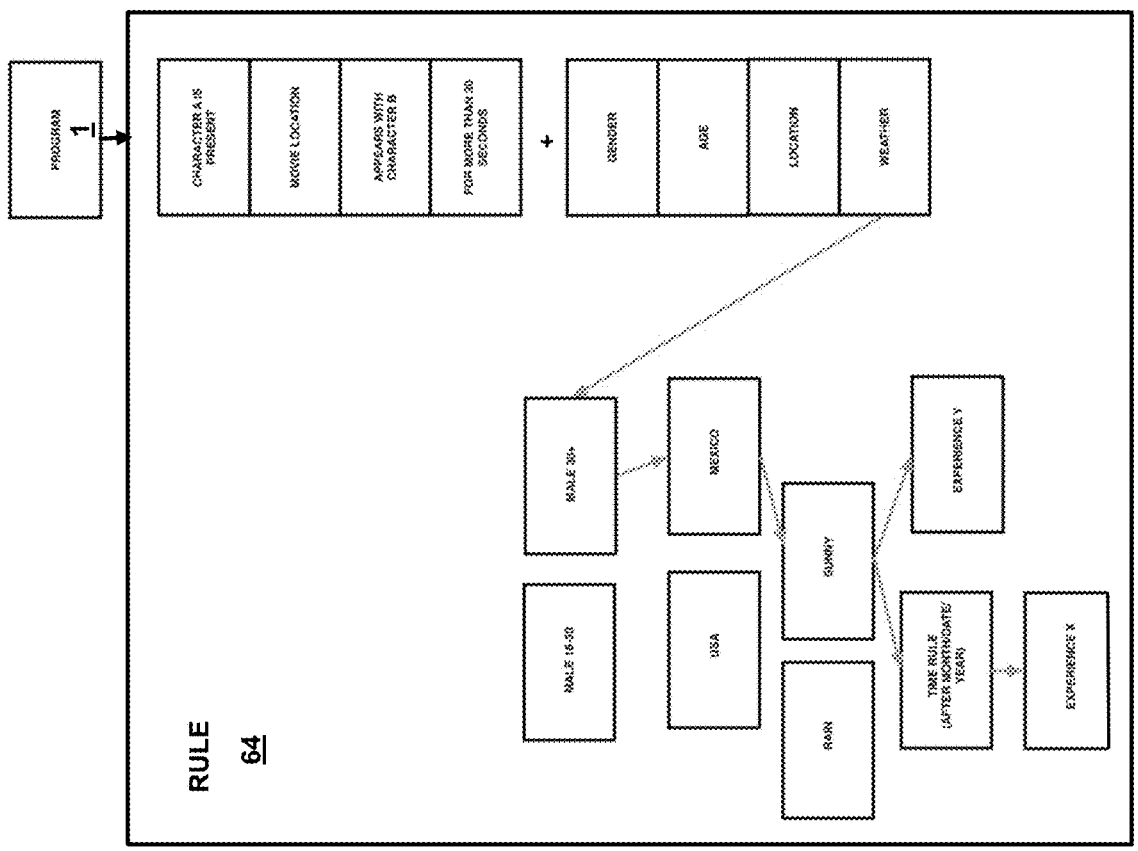

FIG. 10 illustrates a combination environmental and timeline rule 64 applicable to the program 1. In the combo rule 64, if a particular character is currently present on screen, and the movie takes place at a specific location, and a second character appears with the first character for more than 30 seconds, AND if the audience member is male, older than 30, in Mexico, where it is sunny, an experience Y (which presents one or more ancillary data objects to the audience member) is offered until a certain date after which an experience X (which presents one or more ancillary data objects different from those of experience Y to the audience member) is offered.

Figure 11:
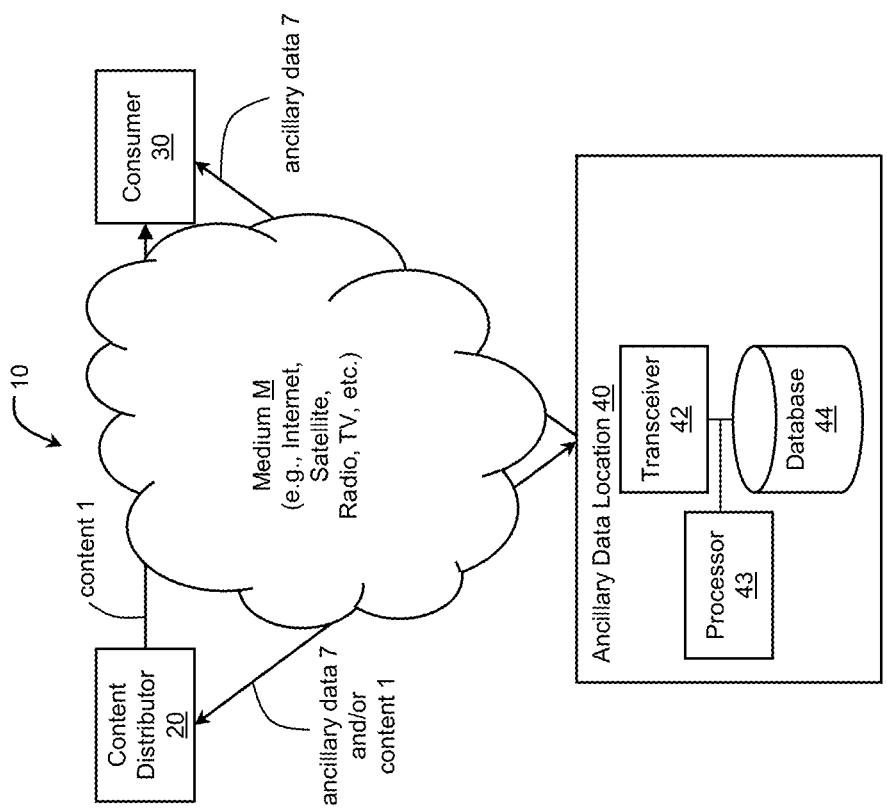
FIG. 11 illustrates a block diagram of an exemplary system for curating and presenting ancillary data to be presented to audience members of the content.

FIG. 11 illustrates a block diagram of an exemplary system 10 for curating and presenting ancillary data to be presented to audience members of the content 1. The system 10 includes three major components: the content distributor 20, the consumer 30, and the ancillary data location 40. FIG. 11 also shows the medium M through which the content distributor 20, the consumer 30, and the ancillary data location 40 communicate with each other.

The element 20 is not limited to broadcasters or broadcasting facilities or equipment. In practice, the content distributor 20 may represent any facility or equipment that is part of or used in preproduction, production, postproduction, quality control, mastering equipment, broadcasting of any type (including professional or social media broadcasting), or other method of sending and distributing audio visual content, that touches the audiovisual content 1 prior to and during playout for transmission or broadcasting including a consumer's own devices such as a DVR, natural language processing devices (e.g., Amazon's Echo), etc.

Similarly, although for ease of explanation the present disclosure refers to the element 30 as the consumer 30, the element 30 is not limited to consumers or consumer premises or equipment. In practice, the consumer 30 may represent any premise or equipment that touches the audiovisual content 1 during or post playout for transmission, broadcasting, etc.

Regarding the ancillary data location 40 and authorship or collection of ancillary data 7, ancillary data 7 may be obtained or collected prior to playout, broadcast, distribution or performance of the audiovisual content 1. For example, ancillary data 7 may be obtained or collected during pre-production, production, post-production, quality control, or mastering of the audiovisual content 1. Ancillary data 7 may also be obtained or collected during playout, broadcast, distribution or performance of the audiovisual content 1. For example, if the audiovisual content 1 is a TV show, ancillary data 7 may be obtained or collected during a first or subsequent broadcast of the TV show.

Regarding storage and distribution, ancillary data 7 collected may be stored in a database 44 that may be made accessible to future users or viewers of the audiovisual content 1. This way, when the audiovisual content 1 is later distributed to those users or viewers, the ancillary data 7 may be available to those users or viewers for consumption at the same time as the audiovisual content 1. The ancillary data 7 appears or manifests itself aligned in time to the audiovisual content 1.

Also, the medium M may be any medium used to transmit content 1 or data generally such as, for example, the Internet, satellite communication, radio communication, television communication (broadcast or cable), etc. Although in the figures the medium M is shown as being shared by the content distributor 20, the consumer 30, and the ancillary data location 40, communication between these elements does not need to take place in the same medium. So, for example, the content distributor 20 may communicate with the consumer 30 via satellite while the content distributor 20 communicates to the ancillary data location 40 via the Internet.

In the example of FIG. 11, the content distributor 20 transmits the audiovisual content 1 to the consumer 30. The consumer 30 receives the audiovisual content 1 from the content distributor 20 and the ancillary data 7 from the ancillary data location 40.

The ancillary data location 40 may include a machine or group of machines for curating and presenting ancillary data correlated to content 1. The ancillary data location 40 may include a transceiver 42 that communicates (i.e., transmits and receives) the content 1 and/or the ancillary data 7 and a processor 43 that correlates the ancillary data 7 to the content 1 by creating timeline and environmental rules as described above. The ancillary data location 40 may also include a database 44 that stores the ancillary data 7 correlated to instants in the content 1.

The ancillary data location 40 may be a location accessible to the content distributor 20 and the consumer 30, such as the cloud or a local archive with general accessibility (e.g., via a link as described above) that may be controlled by subscription, password, etc.

The system 10 may be implemented using software, hardware, analog or digital techniques.

Figure 12:
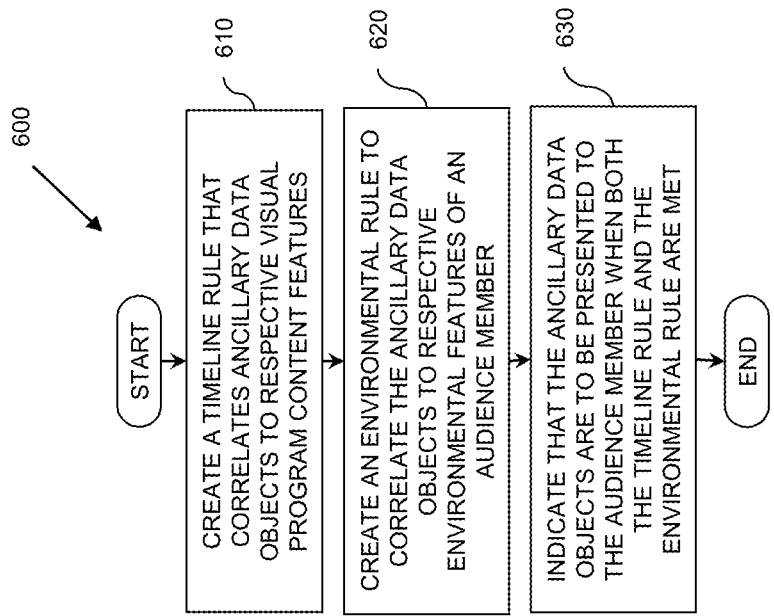
FIG. 12 illustrates a flow diagram for an exemplary method for curating ancillary data to be presented to audience members of a visual program content.
Figure 13:
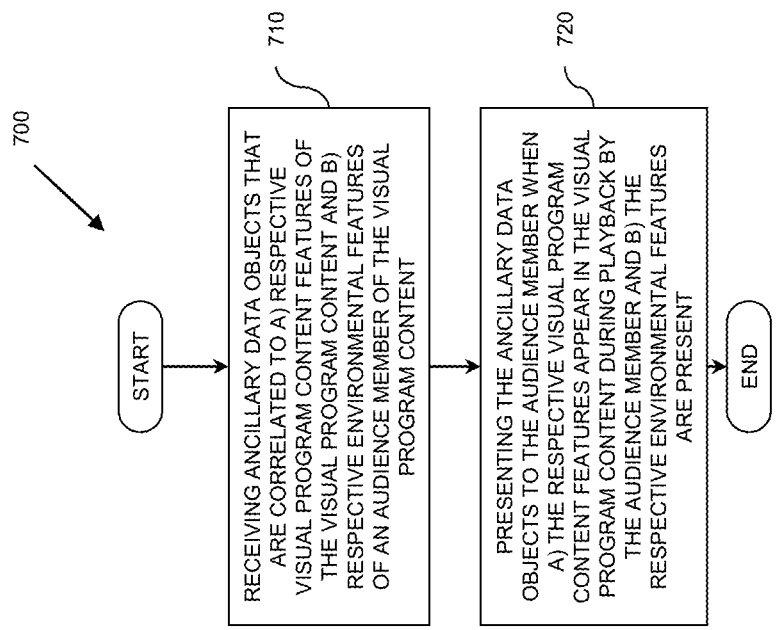
FIG. 13 illustrates a flow diagram for an exemplary method for presenting ancillary data to audience members of a visual program content.

Exemplary methods may be better appreciated with reference to the flow diagrams of FIGS. 12 and 13. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 12 illustrates a flow diagram for an exemplary method 600 for curating ancillary data to be presented to audience members of a visual program content.

The method 600 includes at 610 creating a timeline rule that correlates ancillary data objects to respective visual program content features. The visual program content features are correlated to respective instances on a timeline of the visual program content.

At 620, the method 600 further includes creating an environmental rule to correlate the ancillary data objects to respective environmental features of an audience member.

At 630, the method 600 further includes indicating that the ancillary data objects are to be presented to the audience member when both the timeline rule and the environmental rule are met such that the ancillary data objects may be presented to the audience member when both a) the respective ones of the visual program content features appear in the visual program content during playback by the audience member and b) the respective environmental features are present.

FIG. 13 illustrates a flow diagram for an exemplary method 700 for presenting ancillary data to audience members of a visual program content.

The method 700 includes at 710 receiving ancillary data objects that are correlated to a) respective visual program content features of the visual program content and b) respective environmental features of an audience member of the visual program content. The visual program content features are correlated to respective instances on a timeline of the visual program content.

At 720, the method 700 further includes presenting the ancillary data objects to the audience member when a) the respective visual program content features appear in the visual program content during playback by the audience member and b) the respective environmental features are present.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed, and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 14:
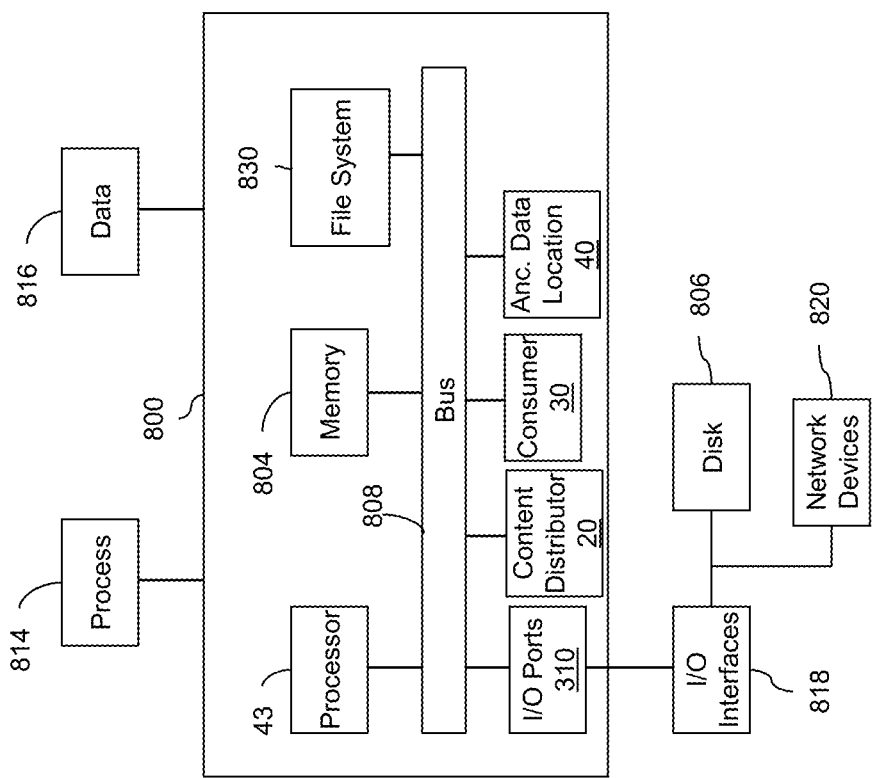
FIG. 14 illustrates a block diagram of an exemplary machine for curating and/or presenting ancillary data to be presented to audience members of a visual program content.

FIG. 14 illustrates a block diagram of an exemplary machine 800 for curating and/or presenting ancillary data to be presented to audience members of a visual program content. The machine 800 includes a processor 43, a memory 804, and I/O Ports 810 operably connected by a bus 808.

In one example, the machine 800 may receive input signals including the audiovisual content 1, the visual portion 3, the audio portion 5, the ancillary data 7, the representation 9, etc. via, for example, I/O Ports 810 or I/O Interfaces 818. The machine 800 may also include the transceiver 42, the processor 43, and the database 44 of the ancillary data location 40. Thus, the content distributor 20, the consumer 30, or the ancillary data location 40 may be implemented in machine 800 as hardware, firmware, software, or a combination thereof and, thus, the machine 800 and its components may provide means for performing functions described and/or claimed herein as performed by the transceiver 42, the processor 43, and the database 44.

The processor 43 can be a variety of various processors including dual microprocessor and other multi-processor architectures. The memory 804 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the machine 800 via, for example, an I/O Interfaces (e.g., card, device) 818 and an I/O Ports 810. The disk 806 can include, but is not limited to, devices like a magnetic disk drive, a solid-state disk drive, a floppy disk drive, a tape drive, a Zip drive, a flash memory card, or a memory stick. Furthermore, the disk 806 can include optical drives like a CD-ROM, a CD recordable drive (CD-R drive), a CD rewriteable drive (CD-RW drive), or a digital video ROM drive (DVD ROM). The memory 804 can store processes 814 or data 816, for example. The disk 806 or memory 804 can store an operating system that controls and allocates resources of the machine 800.

The bus 808 can be a single internal bus interconnect architecture or other bus or mesh architectures. While a single bus is illustrated, it is to be appreciated that machine 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 800 may interact with input/output devices via I/O Interfaces 818 and I/O Ports 810. Input/output devices can include, but are not limited to, a keyboard, a microphone, a pointing and selection device, cameras, video cards, displays, disk 806, network devices 820, and the like. The I/O Ports 810 can include but are not limited to, serial ports, parallel ports, and USB ports.

The machine 800 can operate in a network environment and thus may be connected to network devices 820 via the I/O Interfaces 818, or the I/O Ports 810. Through the network devices 820, the machine 800 may interact with a network. Through the network, the machine 800 may be logically connected to remote computers. The networks with which the machine 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 820 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"Content" corresponds to still images, segments of audio media, video media, or audio/visual (AV) media and include information that is embodied, stored, transmitted, received, processed, or otherwise used with at least one medium. Common media content formats include FLV format (flash video), Windows Media Video, RealMedia, MFX, Quicktime, MPEG, MP3, DivX, JPEGs, and Bitmaps. As used herein, the terms "media clips", "media content," "information content," and "content" may be used interchangeably.

"Data store" or "database," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software-controlled microprocessor, discrete logic like an application specific integrated circuit (ASIC), a programmed logic device, a memory device containing instructions, or the like. Logic may include one or more gates, combinations of gates, or other circuit components.

Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

In broadcasting, "playout" is a term for the transmission of radio or TV channels from the broadcaster into broadcast networks that delivers the content to the audience.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User" or "consumer," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A machine or group of machines for curating ancillary data to be presented to audience members of a visual program content, comprising:
    a first graphical user interface including a plurality of tracks extending along a timeline of the visual program content, each track corresponding to a visual program content feature from a plurality of visual program content features, each track indicating time periods on the timeline of the visual program content in which the corresponding visual program content feature appears in the visual program content, at least one of the time periods corresponding to a length of a scene of the visual program content, at least one of the time periods during the scene being shorter than the length of the scene, and at least one of the time periods being longer than the length of the scene;

a second graphical user interface configured to create:
- a timeline rule that correlates ancillary data objects to respective tracks of the plurality of tracks such that an ancillary data object appears in correlation to a respective visual program content feature during the time periods on the timeline of the visual program content in which the corresponding visual program content feature appears in the visual program content; and
- an environmental rule that correlates the timeline rule to respective environmental features of an audience member; and a processor operably connected to the first graphical user interface and to the second graphical user interface and configured to transmit a signal indicating that the ancillary data objects are to be presented to the audience member when both the timeline rule and the environmental rule are met such that the ancillary data objects are presented to the audience member when a) the respective ones of the visual program content features appear in the visual program content during playback by the audience member and b) the respective environmental features are present.

2. The machine or group of machines of claim 1, wherein the visual program content features are selected from a group comprising:
content title;
characters;
content script or plot;
content scene;
wardrobe wore by the characters;
performers, producers, or directors of the content;
items appearing in the content;
geographical locations where the content storyline takes place;
music in audio of the content; and
statistics related to the content such as sports statistics.

3. The machine or group of machines of claim 1, wherein the environmental features of the audience member include:
a date range in which the audience member watches the visual program content;
a geographical location of the audience member;
a time zone of the audience member;
gender of the audience member; and
an age range of the audience member.

4. The machine or group of machines of claim 1, wherein the environmental rule indicates that an ancillary data object is to be presented to the audience member when a correlated environmental feature of the audience member is present.

5. The machine or group of machines of claim 1, wherein the indicating that the ancillary data objects are to be presented to the audience member includes making an ancillary data object selectable by the audience member on a display on which the visual program contents is displayed or on a second display, wherein the audience member selecting the ancillary data object when presented displays additional information regarding the ancillary data object.

6. The machine or group of machines of claim 1, wherein the indicating that the ancillary data objects are to be presented to the audience member includes making an ancillary data object selectable by the audience member on a display on which the visual program contents is displayed or on a second display only when a) two or more correlated visual program content features appear in the visual program content during playback and b) two or more environmental features of the audience member are present.

7. The machine or group of machines of claim 1, wherein the indicating that the ancillary data objects are to be presented to the audience member includes making an ancillary data object selectable by the audience member on a display on which the visual program contents is displayed or on a second display only when a) one or more correlated visual program content features appear in the visual program content during playback and b) three or more environmental features of the audience member are present.

8. The machine or group of machines of claim 1, wherein the timeline rule indicates that an ancillary data object is to be presented to the audience member when a) a first correlated visual program content feature appears in the visual program content and b) a second correlated visual program content feature appears in the visual program content at the same time as the first correlated visual program content feature.

9. A method for curating ancillary data to be presented to audience members of a visual program content, the method comprising:
receiving at a first graphical user interface indications of time periods on a timeline of the visual program content in which corresponding visual program content features from a plurality of visual content features appear in the visual program content, the first graphical user interface including a plurality of tracks extending along the timeline of the visual program content, each track corresponding to a visual program content feature from the plurality of visual program content features, at least one of the time periods corresponding to a length of a scene of the visual program content, at least one of the time periods during the scene being shorter than the length of the scene, and at least one of the time periods being longer than the length of the scene;
receiving at a second graphical user interface timeline rules and environmental rules including:
creating a timeline rule that correlates ancillary data objects to respective tracks of the plurality of tracks such that an ancillary data object appears in correlation to a respective visual program content feature during the time periods on the timeline of the visual program content in which the corresponding visual program content feature appears in the visual program content;
creating an environmental rule to correlate the timeline rule to respective environmental features of an audience member; and
indicating that the ancillary data objects are to be presented to the audience member when both the timeline rule and the environmental rule are met such that the ancillary data objects are presented to the audience member when a) the respective ones of the visual program content features appear in the visual program content during playback by the audience member and b) the respective environmental features are present.

10. The method of claim 9, wherein the environmental features of the audience member include:
a date range in which the audience member watches the visual program content;

a geographical location of the audience member;
a time zone of the audience member;
gender of the audience member; and
an age range of the audience member.

11. The method of claim 9, wherein the environmental rule indicates that an ancillary data object is to be presented to the audience member when a correlated environmental feature of the audience member is present.

12. The method of claim 9, wherein the indicating that the ancillary data objects are to be presented to the audience member includes making an ancillary data object selectable by the audience member on a display on which the visual program contents is displayed or on a second display, wherein the audience member selecting the ancillary data object when presented displays additional information regarding the ancillary data object.

13. The method of claim 9, wherein the indicating that the ancillary data objects are to be presented to the audience member includes making an ancillary data object selectable by the audience member on a display on which the visual program contents is displayed or on a second display only when a) two or more correlated visual program content features appear in the visual program content during playback and b) two or more environmental features of the audience member are present.

14. The method of claim 9, wherein the indicating that the ancillary data objects are to be presented to the audience member includes making an ancillary data object selectable by the audience member on a display on which the visual program contents is displayed or on a second display only when a) one or more correlated visual program content features appear in the visual program content during playback and b) three or more environmental features of the audience member are present.

15. The method of claim 9, wherein the timeline rule indicates that an ancillary data object is to be presented to the audience member when a) a first correlated visual program content feature appears in the visual program content and b) a second correlated visual program content feature appears in the visual program content at the same time as the first correlated visual program content feature.

* * * * *